(12) United States Patent
Dilday, Jr. et al.

(10) Patent No.: US 11,279,049 B2
(45) Date of Patent: Mar. 22, 2022

(54) RESOURCE LOADING SYSTEM AND METHOD FOR USE IN ATMOSPHERE CONTAINMENT SCENARIOS

(71) Applicant: UCHICAGO ARGONNE, LLC, Chicago, IL (US)

(72) Inventors: Daniel R. Dilday, Jr., Plainfield, IL (US); Roberto T. Reyes, Ottawa, IL (US); Stanley G. Weidmeyer, Glen Ellyn, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 97 days.

(21) Appl. No.: 15/677,290

(22) Filed: Aug. 15, 2017

(65) Prior Publication Data

US 2017/0341242 A1   Nov. 30, 2017

Related U.S. Application Data

(62) Division of application No. 13/948,953, filed on Jul. 23, 2013, now Pat. No. 9,757,866.

(51) Int. Cl.
*B25J 21/02* (2006.01)
*B01L 1/02* (2006.01)
*G21F 7/047* (2006.01)

(52) U.S. Cl.
CPC .......... *B25J 21/02* (2013.01); *B01L 1/02* (2013.01); *G21F 7/047* (2013.01); *Y10T 29/49826* (2015.01)

(58) Field of Classification Search
CPC ...... B65G 51/04–46; G01N 2035/0401; B01L 1/02; B25J 21/02

USPC ..................... 285/95–97, 100, 106
See application file for complete search history.

(56) References Cited

U.S. PATENT DOCUMENTS

| | | | |
|---|---|---|---|
| 2,537,284 A | | 1/1951 | Schuder |
| 2,985,469 A | | 5/1961 | Bowman, Jr. |
| 3,023,995 A | * | 3/1962 | Hopkins ................. F16L 17/10 251/5 |
| 3,033,594 A | * | 5/1962 | Cushman ................ F16L 37/06 285/97 |
| 3,170,544 A | | 2/1965 | Kinkead et al. |
| 3,695,637 A | * | 10/1972 | Satterthwaite .......... F16L 17/10 285/97 |
| 4,194,750 A | * | 3/1980 | Sovish ..................... F16L 5/02 174/77 R |
| 4,216,981 A | * | 8/1980 | Jensen ..................... F16J 15/46 285/97 |
| 4,741,561 A | * | 5/1988 | Morita ................... F16J 15/004 285/106 |
| 4,786,087 A | * | 11/1988 | Thewlis .................. F16L 17/10 285/288.7 |

(Continued)

*Primary Examiner* — Aaron M Dunwoody
(74) *Attorney, Agent, or Firm* — Cherskov Flaynik & Gurda, LLC (57) ABSTRACT

The invention provides a system for preventing fluid exchange between the interior and exterior of containment enclosures such as process-, hazard-, and research-enclosure systems generally, gloveboxes, containment systems, isolation systems, confinement systems, cleanrooms, negative air systems, and positive air system areas while simultaneously providing material transfer into and out of the enclosures. The invention also provides a method for transporting material into or out of a containment structure.

11 Claims, 11 Drawing Sheets

(56) References Cited

U.S. PATENT DOCUMENTS

| | | | | |
|---|---|---|---|---|
| 4,955,641 | A | * | 9/1990 | Dent .......................... F16L 5/02 |
| | | | | 285/237 |
| 5,180,008 | A | * | 1/1993 | Aldridge ................. E21B 33/03 |
| | | | | 166/84.1 |
| 5,380,049 | A | | 1/1995 | Smowton |
| 5,765,339 | A | | 6/1998 | Garland |
| 5,924,743 | A | * | 7/1999 | Bonmartin ............ F16L 55/163 |
| | | | | 277/331 |
| 6,364,923 | B1 | | 4/2002 | Wiedmeyer et al. |
| 6,481,927 | B2 | * | 11/2002 | Rhodes ................... E02B 11/00 |
| | | | | 277/315 |
| 6,601,852 | B1 | * | 8/2003 | Kogler ...................... F16L 5/02 |
| | | | | 138/108 |
| 6,625,958 | B1 | * | 9/2003 | Marcheschi ........... B65G 51/04 |
| | | | | 53/111 R |
| 7,080,687 | B2 | * | 7/2006 | Butterfield, Jr ......... E21B 33/16 |
| | | | | 166/156 |
| 7,614,644 | B2 | | 11/2009 | Hoffman et al. |
| 8,544,894 | B1 | * | 10/2013 | Borba ..................... F16L 17/10 |
| | | | | 141/287 |
| 8,882,154 | B1 | * | 11/2014 | Howell .................... F16L 37/62 |
| | | | | 138/99 |
| 2008/0084062 | A1 | * | 4/2008 | Krohn ..................... F16L 19/07 |
| | | | | 285/104 |

\* cited by examiner

RESOURCE LOADING SYSTEM AND METHOD FOR USE IN ATMOSPHERE CONTAINMENT SCENARIOS

CROSS-REFERENCE TO RELATED APPLICATIONS

This application claims the benefit of priority as a divisional of U.S. patent application Ser. No. 13/948,953, filed on Jul. 23, 2013, currently pending.

CONTRACTUAL ORIGIN OF THE INVENTION

The United States Government has rights in this invention pursuant to Contract No DE-AC02-06CH11357 between the United States Government and UChicago Argonne, LLC representing Argonne National Laboratory.

BACKGROUND OF THE INVENTION

1. Field of the Invention

This invention relates generally to the field of industrial laboratory safety and security, and specifically this invention relates to a system and method for providing rapid changeover for various resource types, and for easily transferring materials in to and out of a confinement system without the potential for contaminants or atmospheres crossing the confinement barrier.

2. Background of Invention

Atmosphere containment systems have various ports for material transition and resources across the confinement barrier. Gloveboxes, like other containment systems, facilitate the needs of research personnel in handling and manipulating hazardous materials by separating a generally uncontaminated exterior area from a contaminated area. Alternatively, containment systems are used in handling/preparing/packaging sensitive (perhaps purified) materials within a clean room enclosure such as a glovebox so as to isolate the materials from the external environment. The side of the barrier, inside or outside, depends on the use of the confinement system. In "clean" glovebox type applications, as found in the pharmaceutical production industry, the glovebox containment prevents contaminants from entering the product process area. With hazardous material applications, the barrier provides protection to workers manipulating the materials.

Gloveboxes surround and control such hazardous materials by physically isolating the hazard inside a defined enclosure while permitting hands-on work via glove-ports. Since gloveboxes are designed and fabricated for a specific application, future changes in use, with the associated need to change/add resources, is very difficult. As a result, it is not uncommon to see gloveboxes "jury-rigged" in labs to get around the permanently-configured design of the glovebox to make it usable for the required experiment or production process. This jury-rigged resource change, driven by necessity, degrades the containment capability of the glovebox and increases the possibility of loss of containment with consequent problematic effects.

Hazards commonly encountered with traditional glovebox use include, but are not limited to, unmitigated fire propagation inside the glovebox, and hazards specific to a type of technology (e.g., chemical, biological, pharmacological, Engineered Nano Particles, and nuclear). Further, as traditional gloveboxes often lack a convenient method for transferring hazardous materials to and from the glovebox while the glovebox is in use, users of such gloveboxes must load hazardous materials into the glovebox prior to initiating use. This requires anticipating all of the reagent and tool needs prior to beginning work. Furthermore, replacing, removing and/or otherwise transferring hazardous materials in such a glovebox often requires the user to end the usage session and breach the barrier for the required material transfer or glovebox modification and resource addition such as electrical, data, or process fluid additive.

As a result, once glovebox operations begin, users are unable to bring unanticipated yet needed additional materials into the glovebox. In turn, certain aspects of experimental creativity and complexity may be restricted on part of the user. Further, in traditional glovebox arrangements, volume within the glovebox must be first allocated to the housing and storage of a given hazardous contaminant, and also to any product (such as those materials generated via clean room technology) produced. Thus, overall experimental and physical capacity is often limited.

Given the demanding needs of research personnel, traditional gloveboxes lacking a method for transferring contaminant materials during usage are limiting. Further, general administrative and other methods such as bagging or out-right system breach procedures consume time, energy and resources and may be ineffective and/or inefficient at transferring in hazardous materials into the glovebox or purified substances out of the glovebox as desired. For instance, resources may be wasted during such a transfer resulting in a quality risk of bad product, or compromising the integrity of the experiment. Moreover, consumption of the wrong resource during a transfer may result in further production or experimental delays. Also, the proper cleaning of hazardous materials as related to usage with a glovebox may require the user to wear appropriate personal protective equipment ("PPE") resulting in an additional inconvenience. Moreover, consumption of the wrong resource during a transfer may result in further production delays.

Usage of a traditional glovebox lacking an independent means of transferring in and out hazardous materials limits resources available for a given experiment and often does not permit for convenient real-time process change. Further, resource modification, when needed, can become costly. The challenges, either taken individually or in conjunction, can result in lengthy production delays.

A need exists in the art for a system for transferring substrates, tools, and other matters in and out of containment systems, those systems including but not limited to process-, hazard-, and research-enclosure systems generally, and gloveboxes, containment systems, isolation systems, confinement systems, cleanrooms, negative air systems, and positive air system areas specifically. The system should prevent intermingling of containment environments with regions outside of contamination of the environment exterior to the containment system with hazardous materials. Furthermore, the system should operate with existing containment structures and devices.

SUMMARY OF INVENTION

An object of the present invention is to provide a device and method for transporting materials and resources in and out of a containment area, such as a glovebox or cleanroom, that overcomes many of the disadvantages of the prior art.

Another object of the present invention is to provide a device and method for transporting materials in and out of a containment system, such as a glovebox while keeping the internal atmosphere of the containment system sealed from the external atmosphere. A feature of the invention is the use of transport modules that are in one-way slideable communication with the glovebox, to affect transfer into or out of the containment system. An advantage of the invention is that the modules comprise materials transfer encapsulation means such as a flexible webbing, one side of which is in contact with the atmosphere outside the containment enclosure while simultaneously another side of the webbing is in contact with the atmosphere inside the containment enclosure. This configuration assures a substantially complete barrier of atmosphere exchange between the inside of the containment system and the ambient environment contacting the exterior of the containment system while the module is in use.

Still another object of the present invention is to provide a system for transporting materials in and out of a glovebox. A feature of the invention is a materials transport module parts of which are in fluid communication with the interior atmosphere of the glovebox and other parts of which are not in fluid communication with the interior atmosphere glovebox. An advantage of the invention is that the glovebox remains sealed from the external environment during materials transfer, even when more than one module is utilized. This seal is maintained even though two modules are utilized at the same time and are in physical contact with each other during use.

Yet another object of the invention is providing a method for adding or subtracting multiple types of resources individually, in groups, or replacement resources (such as tools, solid materials/reagents/fluid exchange, data ports, electrical outlets, vacuum adapter, or bagging sleeve cartridge) to interior atmospheres of confinement systems such as gloveboxes or clean rooms. A feature of the method is using existing access portals of the confinement systems to receive a plurality of different resource transport vehicles. An advantage of the method is that new vehicles can be utilized simultaneously with expended vehicles without breaching the confinement barrier or compromising the uniqueness or quality of the resource.

Briefly, the invention provides a system for preventing fluid exchange between the interior and exterior of a enclosure during material transport, the system comprising: a cylinder adapted to be received by a region of the enclosure forming an aperture so that a hermetic seal exists between the cylinder and the aperture; a canister coaxially positioned within, and in slideable communication with the cylinder such that a hermetic seal exists between the canister and the enclosure.

Also provided Is a method for transporting material into or out of an enclosure, the method comprising supplying a flexible tube having a first surface in fluid communication with the internal atmosphere of the enclosure, a second surface not in fluid communication with the internal atmosphere, a first end sealed to a third surface not in fluid communication with the internal atmosphere, and a second end sealed upon itself; encapsulating the material with the second surface proximal to the second end; extending the second of the tube into the internal atmosphere of the enclosure; tying off a portion of the tube so that the material is proximal to the second sealed end and the portion of the tube tied off; and cutting the tube between the tied off portion and the second sealed end to expose the material to the internal atmosphere.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a system and method for using already existing containment systems to optimize material and fluid transfer into and out of controlled atmospheres. In an embodiment of the invention, permanent, standard sized ports, which are found on substantially all gloveboxes, are reversibly retrofitted or otherwise utilized to expedite transfer of materials, fluids, wires for two way electrical signals, power, or data transfer; piping, vacuum adaptor, plus in some cases integration with an airlock. Transfer can occur both into and out of a glove box using a bag-in, bag-out device developed by the inventors.

Figure 1:
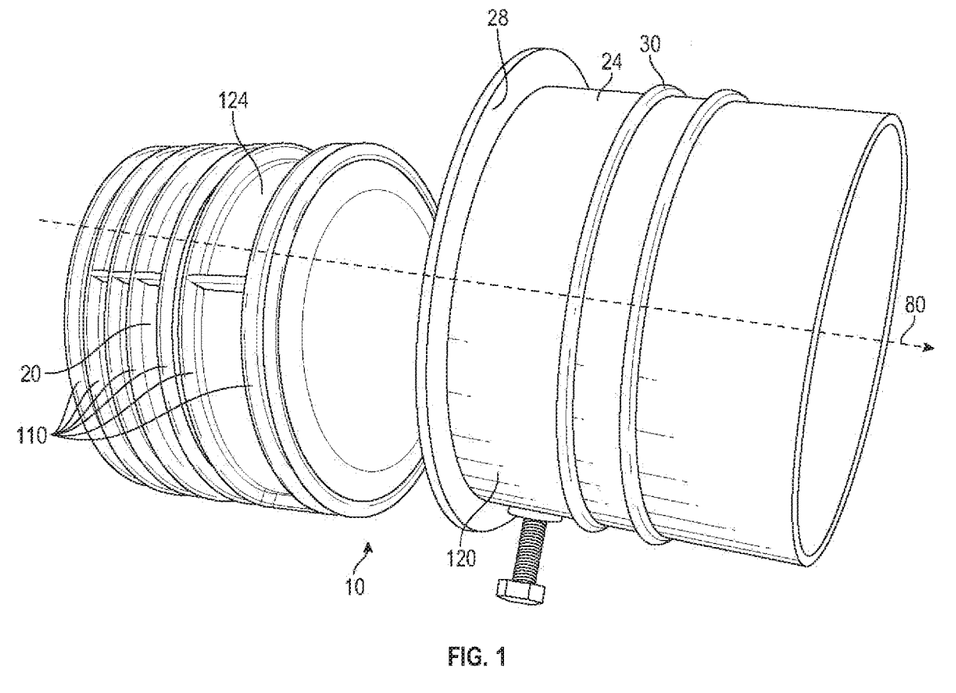
FIG. 1 is a free space perspective view of the transport module positioned for entry into the transport tunnel, in accordance with features of the present invention.
Figure 2:
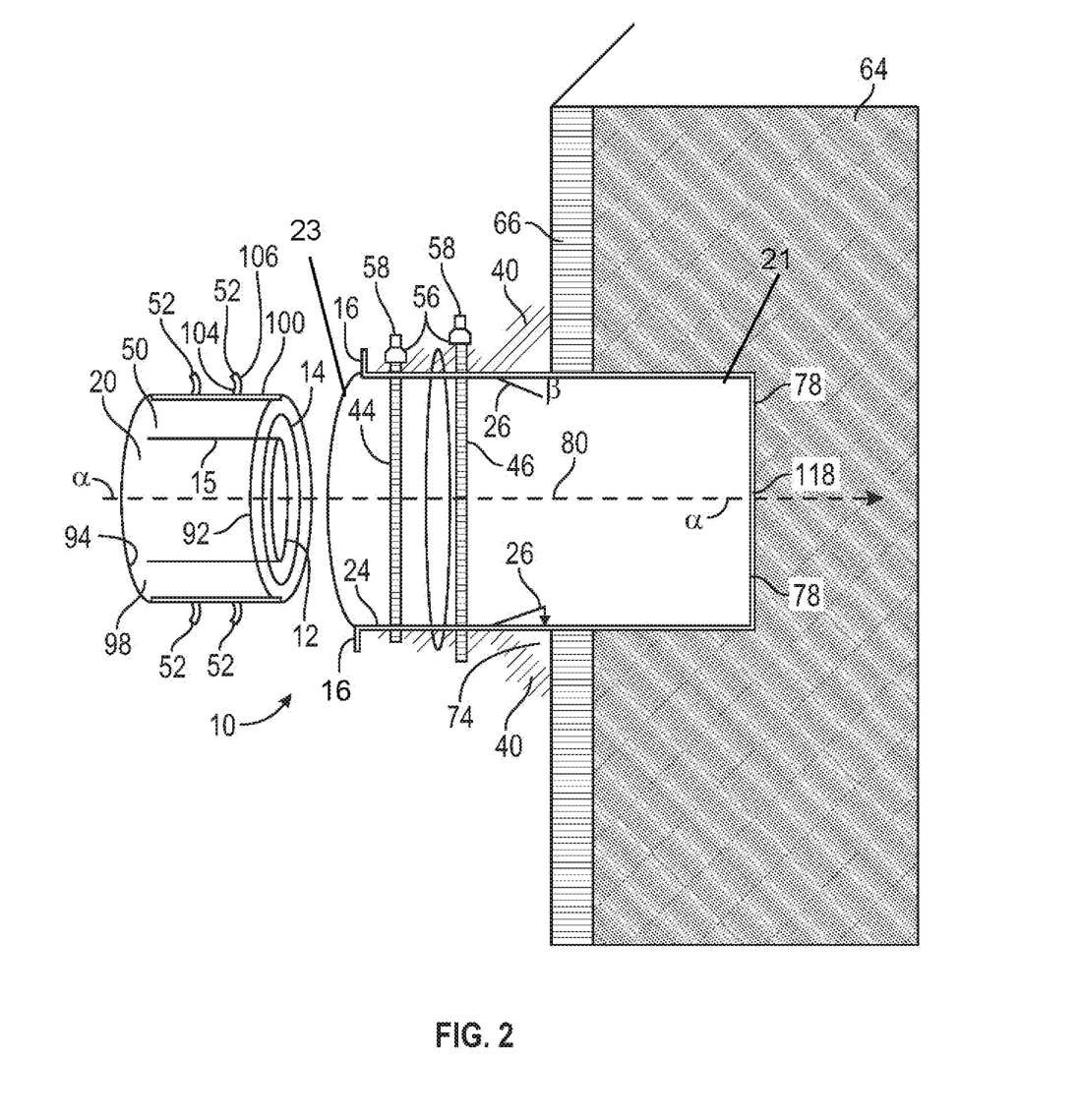
FIG. 2 is an elevational view of one embodiment of the invention.

Turning to the figures, a view of one embodiment of the confinement unidirectional resource loading system 10 is found in FIG. 1. The loading system 10 comprises several overall elements including a materials transport module 20 and a materials transport tunnel 24. The materials transport tunnel has an opening at each of its two ends and is substantially continuous so as to have solid sides impervious to fluids. As depicted in FIG. 2, the transport tunnel 24 is adapted to be coaxially and removably received by an aperture 12 which defines a typical glove port 40 formed in vertically disposed walls 66 of standard gloveboxes. The transport module serves as a vehicle for bagging in and bagging out environmentally sensitive reagents, and also serves as vehicle for transporting tools, hardware and other substrates.

In operation, the transport module 20 and transport tunnel 24 are spatially arranged via a longitudinal axis a of the loading system 10. The materials transport module 20, such as a canister, has a first end 92 and a second end 94, the module defining a first cross section. The materials transport tunnel 24, such as a transport tunnel extends length-wise into a contaminated interior cavity 64 of a glovebox. The interior cavity 64 of the glovebox is separated from an area outside the glovebox by the vertically disposed wall 66 of the glovebox having a defined thickness.

Radially extending protrusions 52 are integrally molded with an exterior surface 100 of the materials transport module 20. These protrusions 52 provide a means for initial insertion and subsequent movement limitation of the bag canister 20 into the materials transport tunnel 24. The cross sections of each the materials transport module 20 and the materials transport tunnel 24 are proportionately sized such that the protrusions 52 may contact an inner surface of the tunnel 24. In an embodiment of the invention, the protrusions are arc shaped defining a concave surface and a convex surface. The materials transport module 20 is inserted into the materials transport tunnel 24 such that the convex surface faces toward the containment structure, such as a glovebox. More generally, the transport module 20 is inserted into the materials transport tunnel 24 such that the convex surface faces in the direction in which the module 20 will travel.

A first end 21 of the materials transport tunnel 24 may terminate in a medially directed lip 78 comprised of reversibly deformable material. A second end 23 of the materials transport tunnel terminates in a radially-directed flange 16. The flange facilitates easy entry of the materials transport module 20 (such as a bag canister described infra) into the transport tunnel 24 in a direction toward the glovebox. The arc-shaped protrusions 52 compress against a flexible movement limiter 26 when advancing toward the glovebox. The limiter 26 prevents a transport module 20 from being pulled backward once inserted into the tunnel 24. The movement limiters 26 comprise reversibly deformable elongated substrate such as spring metal, one end of which is attached to an inwardly directed surface of the tunnel 24 and the other end of which is unattached and positioned medially from the inwardly directed surface of the tunnel such that the movement limiter 26 forms an acute angle β to the inwardly directed surface. The arc-shaped protrusions 52 have concave inner sections 104 facing away from the glovebox so as to reversibly interlock with the flexible movement limiter 26 to prevent movement of the bag canister 20 away from the glovebox.

To optimize the interplay between the movement limiter 26 and the protrusions 52, the circumference of the transport tunnel 24 may be further constricted via a first tightening clamp, clip or belt 44 and a second tightening clamp, clip or belt 46 to increase compressive force between the arc-shaped protrusions 52 and the flexible movement limiter 26 as needed. Screws 58 thread into set bindings 56 which are affixed on to the tightening belts 44 and 46, respectively. The tightening belts 44, 46, (e.g., jubilee clips) extend circumferentially around the transport tunnel 24 so as to confer a medially-directed compressive force upon the tunnel, that force ultimately to be transferred to any materials transport module 20 residing in the tunnel.

Upon insertion of the materials transfer module 20 into the transfer tunnel 24 and passage through the flexible movement limiter 26, the bag canister may abut against a medially directed, flexible partition or lip 78. An embodiment of the lip comprises a rubber overhang which is substantially rigid to stymie (but not prevent) continued movement of the transport module 20 toward the glovebox without additional force applied. In essence, the overhang provides a tactile signal point to the operator that the end of the tunnel has been reached by the module.

Materials Transport
Module Detail

A salient feature of the invention is that the materials transport module 20 travels in one direction, which is toward the interior of a containment structure, such as a clean room or glovebox. The materials transport module 20 comprises a myriad of configurations, depending on the material to be shuttled into or out of the glovebox. For example, the materials transport module can comprise an electrical outlet, a transport bagging canister (described below), utilities, USB Data Port interface, a process gas input, a new glove and any other resource that the user needs that can fit within the confinement penetration. The placement of the module within the tunnel 24 results physical confinement penetration whereby forward portions of the module 20 protrude into or make contact with the interior atmosphere of the containment while aft portions of the module remain free of contact with the interior atmosphere. All the while, flexible webbing portions of the module are capable of making fluid and solid transfers between the interior and exterior atmospheres.

In an embodiment of the invention, the materials transport module 20 defines a housing for stowing an elongated flexible tubular poly sleeve 82 comprising reversibly deformable plastic film or other type of plastic extrusion webbing, the tube (e.g. a bag) having a first end and a second end. The first end of the tube is sealed to or otherwise attached to a first end 92 of an interior region of the module, that region shaped as a longitudinally extending annular space 50. In this embodiment, the materials transport module 20 is cylindrical in shape and has a medially extending lip 14 circumscribing a periphery of the bag canister 20, thereby creating a medially disposed, longitudinally extending portal which is coaxial with the longitudinal axis a of the materials transport module 20. This portal defines a second cross section. The lip 14 terminates in approximately a 90 degree bend and extends axially from an exterior perimeter 112 of the first end 92 such that the portal comprises a sleeve 15 extending substantially the entire length of the materials transport module 20. The sleeve 15 terminates proximal to the second end 94 of the materials transport module 20 so as to define the second cross section. However, unlike the configuration defining the second cross section at the first end 92 of the module, the second cross section at the second end provides a means 98 for accessing the annular space 50.

As described earlier, the materials transport module 20 (such as a bag canister) has the circular lip 14 that extends in the inward radial direction from a perimeter 96 at the end 92 of the bag canister. Similarly, the circular lip 14 extends in the inward radial direction from the opposing end 94 of the bag canister 20. Further, the cylindrical interior section 12 extends length-wise through the bag canister 20 from the circular lip 14 located at the opposing end 94. The pliable bag 82 may be embedded for storage in an annular space 50 located in between the circular lip 14 and the cylindrical interior section 12. A user may extract the pliable bag 82 from an open end 98 of the sleeve 15, and then thread the bag in the forward direction 80 to enter into the contaminated interior cavity 64 of the glovebox.

Figure 3:
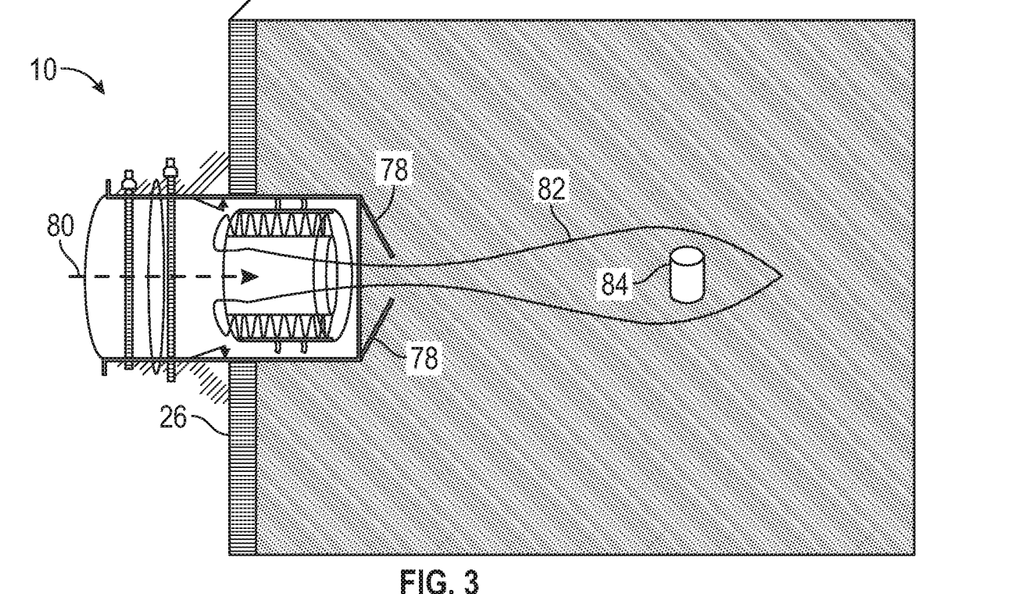
FIG. 3 is a schematic view of the invented system in use at the start of a materials transfer process, in accordance with features of the present invention; transport tunnel.
Figure 4:
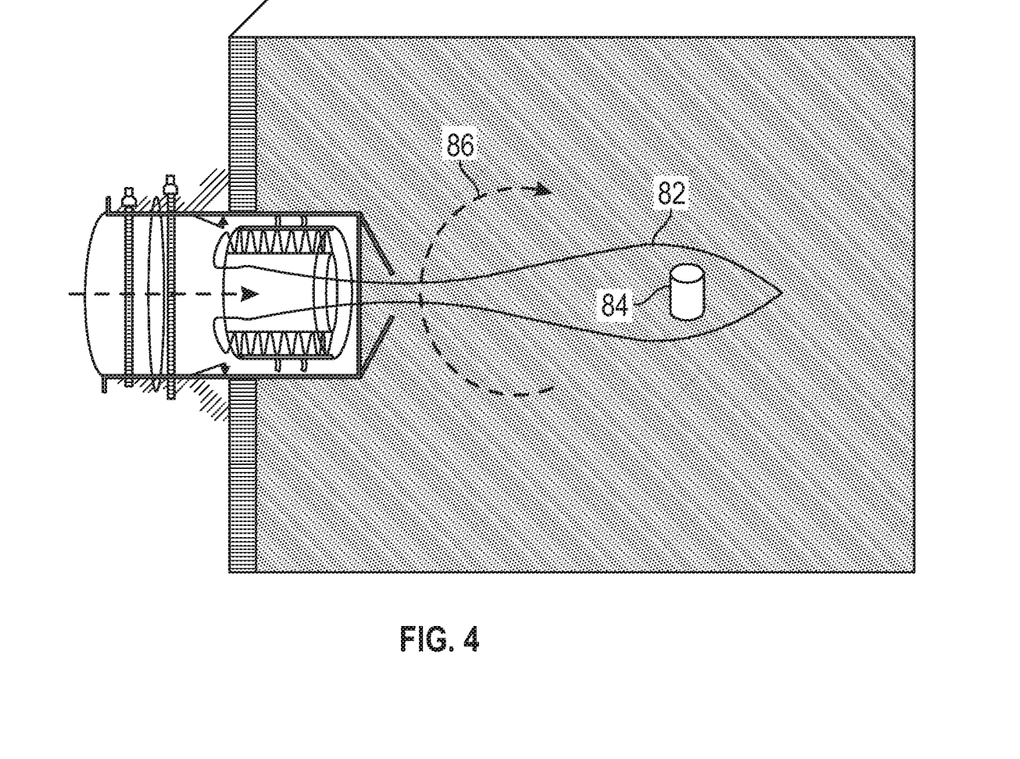
FIG. 4 is a schematic view of the invented system in use about midway through a materials transfer process, in accordance with features of the present invention.
Figure 5:
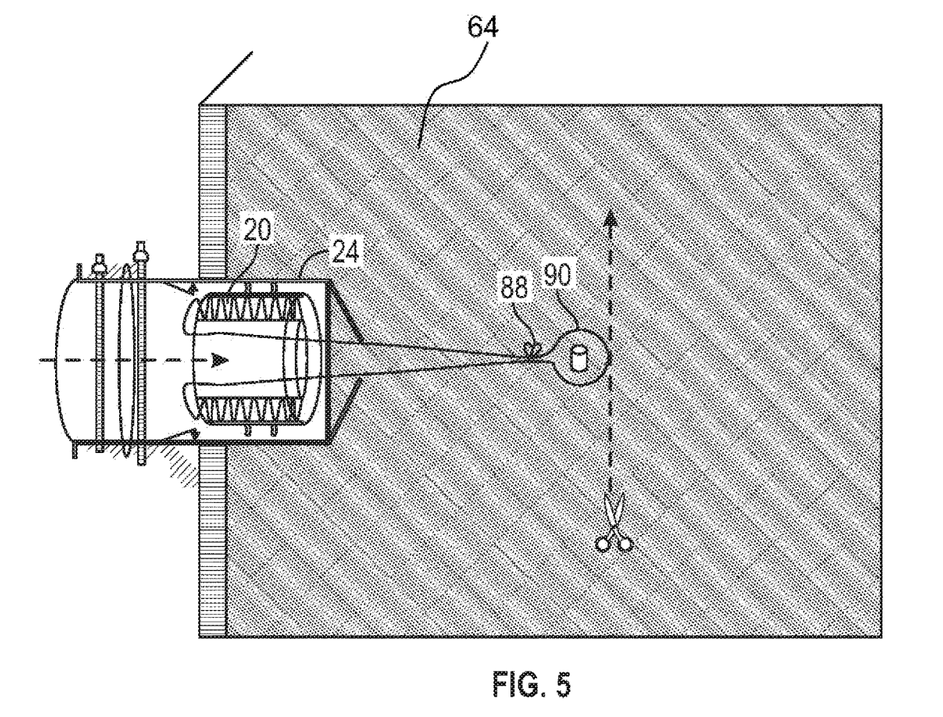
FIG. 5 is a schematic view of the invented system in use near the end of a materials transfer process, in accordance with features of the present invention.

FIG. 3-5 illustrates the bag-in bag-out materials transport module 20 in operation for the bag-in procedure, so called in that materials to be transported into a containment are first bagged externally and then transported into the containment area. It is noteworthy that the bag-in procedure can also be employed as a bag-out procedure whereby materials to be transported out of a containment are first bagged up within the containment and then transported out of the containment. FIG. 3 pictures a front surface of the materials transport module 20 as having progressed left to right to the end of the transport tunnel 24. At this point, the front surface of the materials transport module 20 is in close spatial relationship to a free end of the flexible rubber seal 78. Any further progression of the materials transport module 20 in an axial direction toward the interior of the glovebox would result in the module contacting the free end of the rubber seal and causing the free end to shift away from the transport tunnel transport tunnel 24 and toward the interior of the containment interior. (See FIG. 6.)

As shown here, movement of the rubber seal 78 creates an opening such as an iris defined by the unattached portions of the rubber seal 78 permitting the second end of the flexible tube noted supra, and designated herein as 82 to be pushed through the iris or opening defined by the unattached portions of the rubber seal so as to enter into the interior 64 of the glovebox.

As noted supra, the pliable bag 82 is stored within the annular space 50 of the transport module, the bag's open end sealed to an interior region proximal to the first end 92 end of the module 20. Operation of a bag-in/bag-out materials transport module, comprises placing a reagent, substrate, tool or other object 84 inside the pliable bag 82 (heretofore stowed in the annual space 50, said placement preferably occurring prior to the bag 82 being drawn through the opening created by the movement of the flexible rubber seal 78.

Possible methods of pulling the bag 82 through said gap include manipulation by the user inside the glovebox. For example, a user may insert a hand into a glove in a glove-port located adjacent to the loading system 10. Next, the user may take the hand in the glove to further extract the pliable bag 82, as needed, from its semi-deployed position as shown in FIG. 3. Once an item intended for transport is placed in the bag, the bag is tied off 88 so as to isolate the item from the environment exterior to the glovebox interior. Further, upon reaching the bottom of the bag such that no further bag length remains within the annual space, the materials transport module 20 (in this case the bag canister) may be replaced with a second materials transport module 20B (See FIG. 6) such that the second materials transport module 20B is inserted into the materials transport tunnel 24 so as to push the first materials transport module 20 completely through the tunnel and into the interior space of the glovebox.

FIG. 4 next shows a rotational motion 86 being applied to the pliable bag 82 thereby causing a length of the bag to twist upon itself. This twisted portion can be secured by a tie 88 or other device so as to eliminate any fluid communication between the object 84 and the outside atmosphere (i.e., the atmosphere that is outside the interior of the glovebox). As depicted in FIG. 5, the user finally delivers the object to the contaminated interior cavity 64 of the glovebox by clipping that portion 90 of the bag distal from the tie off 88. As described earlier, a user may manipulate the pliable bag 82 by using a hand in a glove in the glovebox.

The materials transport module 20 may be designed to hold several feet or meters of plastic webbing which can be twisted off along its longitudinal axis as needed to transport materials in or out of the glovebox. Once the length of the pliable bag 82 is expended, the bag canister 20 is deemed spent.

Figure 6:
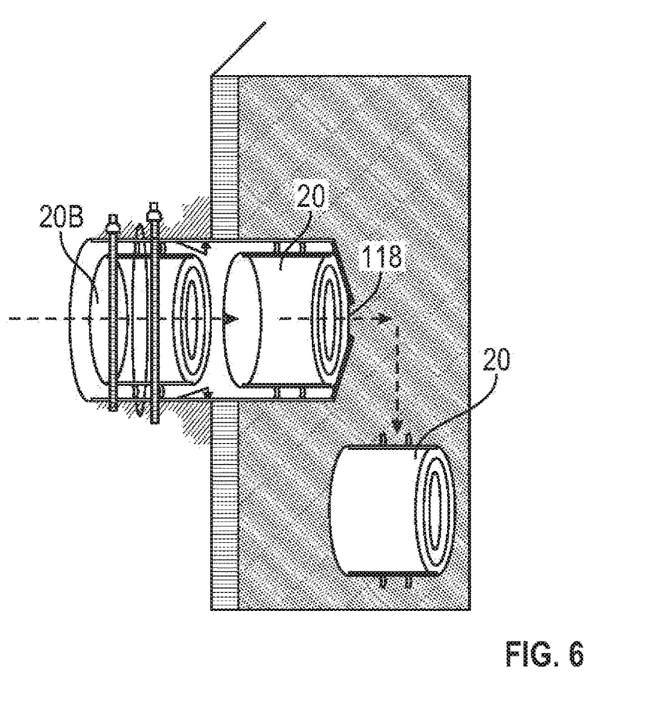
FIG. 6 is a schematic view of the invented transfer system depicting the addition of a second materials transport module into a transport tunnel of the system simultaneous with the expulsion of a first materials transport module from the transport tunnel, in accordance with features of the present invention.

As discussed supra, a second materials transport module 20B with another length of plastic webbing (or carrying some other item) may then be inserted into the transport tunnel 24 to press against the spent materials transport module 20, as shown in FIG. 6. The second materials transport module 20B may contact the spent bag module 20, forcing it to advance toward the interior of the glovebox, forcing it to open and push through the flexible rubber seal 78, and to finally forcing it to fall into the contaminated interior cavity 64 of the glovebox. The first materials transport module can fall to the floor of the containment interior via gravity, centrifugal force, or some other means. For example, a user can grab the forward end of the module and pull the remainder of the module out of the tunnel so as to set it aside in a controlled fashion to prevent tipping of reagent or product containers or damage of equipment or glassware within the containment area.

The confinement unidirectional resource loading system 10 is designed to allow trained personnel to rapidly complete the entire bag canister 20 replacement procedure as described with no special tools, and without the need to wear any protective apparel.

Figure 7:
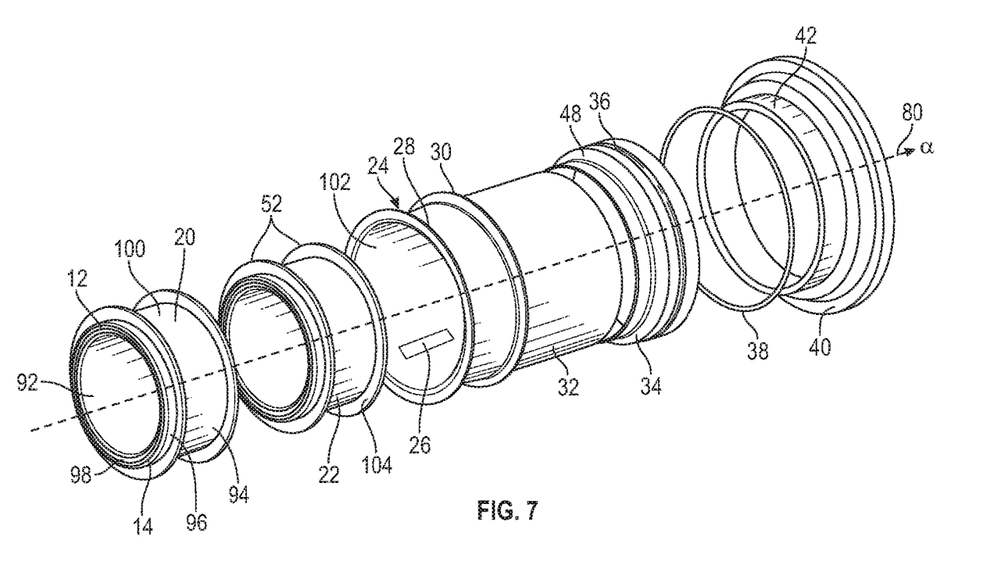
FIG. 7 is an exploded perspective view of an embodiment of the system in accordance with features of the invention.

FIG. 7 shows an exploded view of the confinement unidirectional resource loading system 10 as comprising several concentric cylindrical components including a plurality of materials transport modules 20 coaxially aligned with the transport tunnel materials transport tunnel 24.

The transport modules 20 depicted in FIG. 7 show a plurality of radially projecting ridges 52 from an exterior surface 100 of the modules so as to be substantially completely circumscribing the periphery of the modules. In an embodiment of the invention, the ridges are arc-shaped and extend in a perpendicular orientation from the exterior surface 100 of the transport module 20. As depicted in FIG. 2, these arc-shaped protrusions 52 have a concave inner section 104 that faces away from the glovebox when the system is installed and a convex surface 106 that faces toward the glovebox when the module is installed in the materials transport tunnel 24.

Upon insertion and movement of the bag canister 20 through the transport tunnel 24 transport tunnel the concave surface 104 of arc-shaped protrusion 52 reversibly interlocks with flexible movement limiters 26 to prevent movement of the module 20 in the direction opposite to the forward motion of the transport module 20. Generally, the protrusions 52 also serve as a means to prevent yawing or deflection from the longitudinal axis a of the transport module 20 with the longitudinal axis of the materials transport tunnel 24. Such deflection may otherwise result in atmosphere exchange between the inside and the outside of the glovebox. In addition, the protrusions 52 may comprise a semi-rigid material so as to serve as gaskets between the transport module 20 and the tunnel 24, thereby providing additional means to prevent fluid communication between the interior of a containment structure and the exterior environment/atmosphere.

Transport Tunnel Detail

The transport tunnel 24 rotatably interlocks with an attachment sleeve 34, the latter of which is removably fastened to a portion of the containment structure via a compressible gasket seal (e.g. an O-ring 38) mated with a groove 42 circumscribing the existing glovebox port 40. The transport tunnel 24 has an interior surface 102 and an exterior surface 32. A radially extending lip or ridge 30 is located on the exterior surface 32 of the transport tunnel 24. The stabilization ridge 30 protrudes circumferentially around the exterior surface 32 and provides a sealing edge with a first circumferential periphery 48 of the attachment sleeve 34. Sealing occurs when the transport tunnel 32 is slidably received by the attachment sleeve 34.

An exterior surface of the attachment sleeve 34 defines a circumferentially extending ridge 36 that is adapted to be received by complementary shaped groove 42 located on an existing glove-port 40. Typically, the glove-port 40 is mounted on the interface wall 66 (not pictured). The compressible gasket seal 38 is positioned intermediate the ridge 36 and the groove 42 upon complete assembly of the loading system 10.

Figure 8:
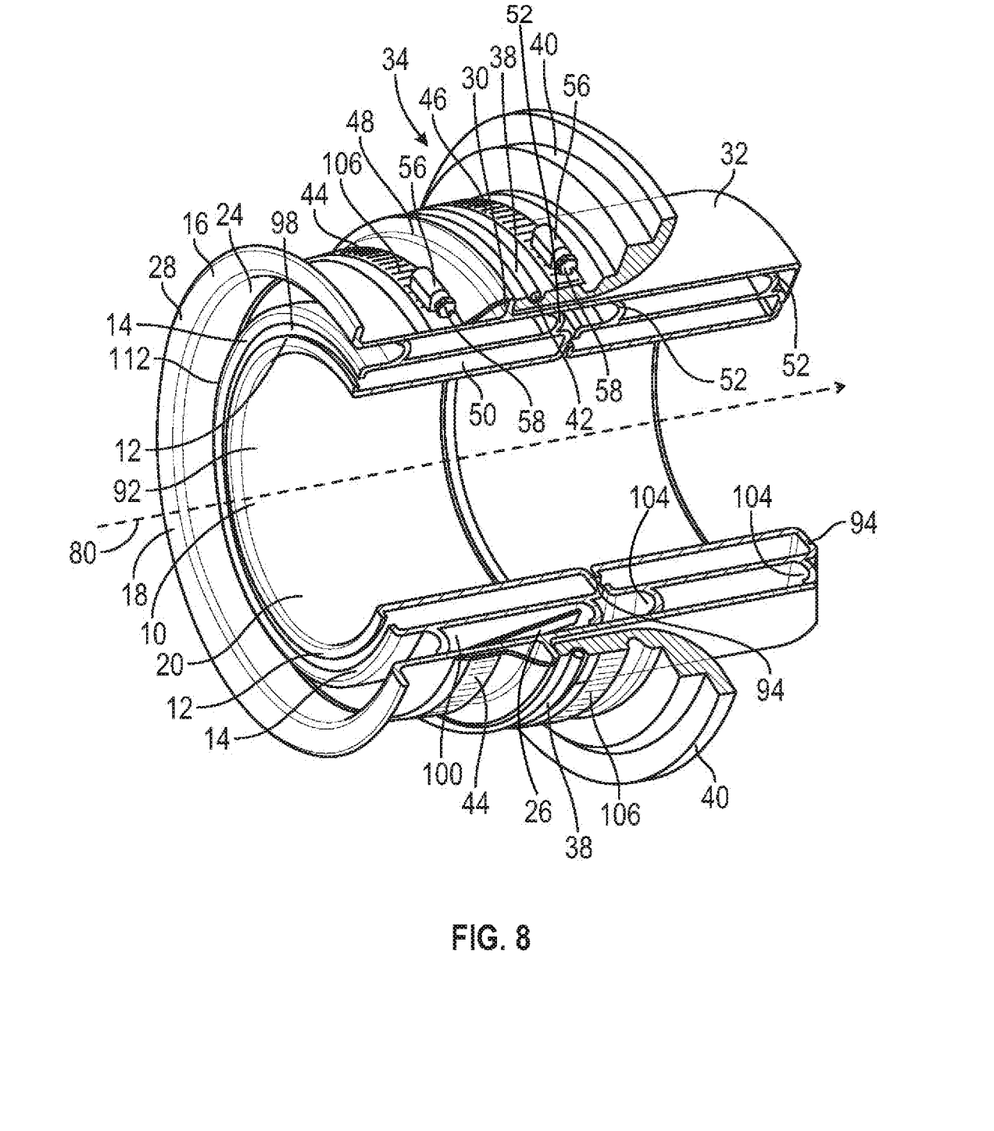
FIG. 8 is a detailed cut-away perspective view of the invented system showing two materials-transport modules nested within a transport tunnel, in accordance with features of the present invention.

FIG. 8 illustrates a close-up cut away of the loading system 10 featuring two coaxially aligned materials transport modules designed to store plastic webbing substrate as discussed supra. The pliable bag 82 (not pictured) may be stored in the vacant storage area 50 and extracted by a user through the gap 98 when necessary for use. It should be noted that while FIG. 8 depicts a configuration for bagging-in scenarios, the configuration can be used when material is to be transported OUT of containment structures, such as gloveboxes. Also, the configuration can be reversed for bagging-out operations, such that modules travel away from clean room containment structures to be collected outside of said clean containment enclosures.

The arc-shaped protrusions 52 (which can also serve as gaskets) extend from the exterior surface 100 of the bag canister 20 and have concave inner sections 104 that face away from the glovebox when the system is installed. The flexible movement limiter 26 is attached to a medially facing surface of the materials transport tunnel module 24 so as to extend inwardly toward the radially facing surface of the transport module. The arc-shaped protrusions 52 reversibly interlock with the flexible movement limiter 26 to prevent movement of the bag canister 20 in the direction away from the containment enclosure (for example a glovebox in bagging in scenarios). The dashed arrow 80 depicts the direction of the modules.

As shown here, the materials transport module 20 slidably inserts into the transport tunnel 24 and contacts a spent materials transport module 20 during routine bag canister 20 replacement procedures. Ideally, this procedure occurs while the spent canister still maintains a seal between the inside of the glovebox and the exterior of the glovebox. Only when the replenishment module is in place does the following operation proceed: Movement of the replenishing module 20 in the forward direction 80 causes the bag canister 20 to contact and abut against the spent bag canister to force the spent bag canister through the flexible rubber seal 78 (not pictured in FIG. 8). The spent bag canister then travels through an opening 118 (not pictured) enlarged by outward movement of the flexible rubber seal to enter into the contaminated interior cavity 64.

The transport tunnel 24 features a guidance brim integrally molded with the radially directed flange. The guidance brim 28 may function to guide the bag canister 20 to slideably enter into the interior of the transport tunnel 24, particularly when a user of the system needs to quickly insert a replacement materials transport module 20 into the tunnel 24.

The attachment sleeve 34 featuring the aforementioned medially facing groove 48 is held firmly in place against the transport tunnel 24 by a first tightening belt 44 and a second tightening belt 46, such as jubilee clamps. Both tightening belts, 44 and 46, are placed around the circumference of the attachment sleeve 34 and may be tightened via rotation of the screws 58 threaded into set bindings 56.

Figure 9:
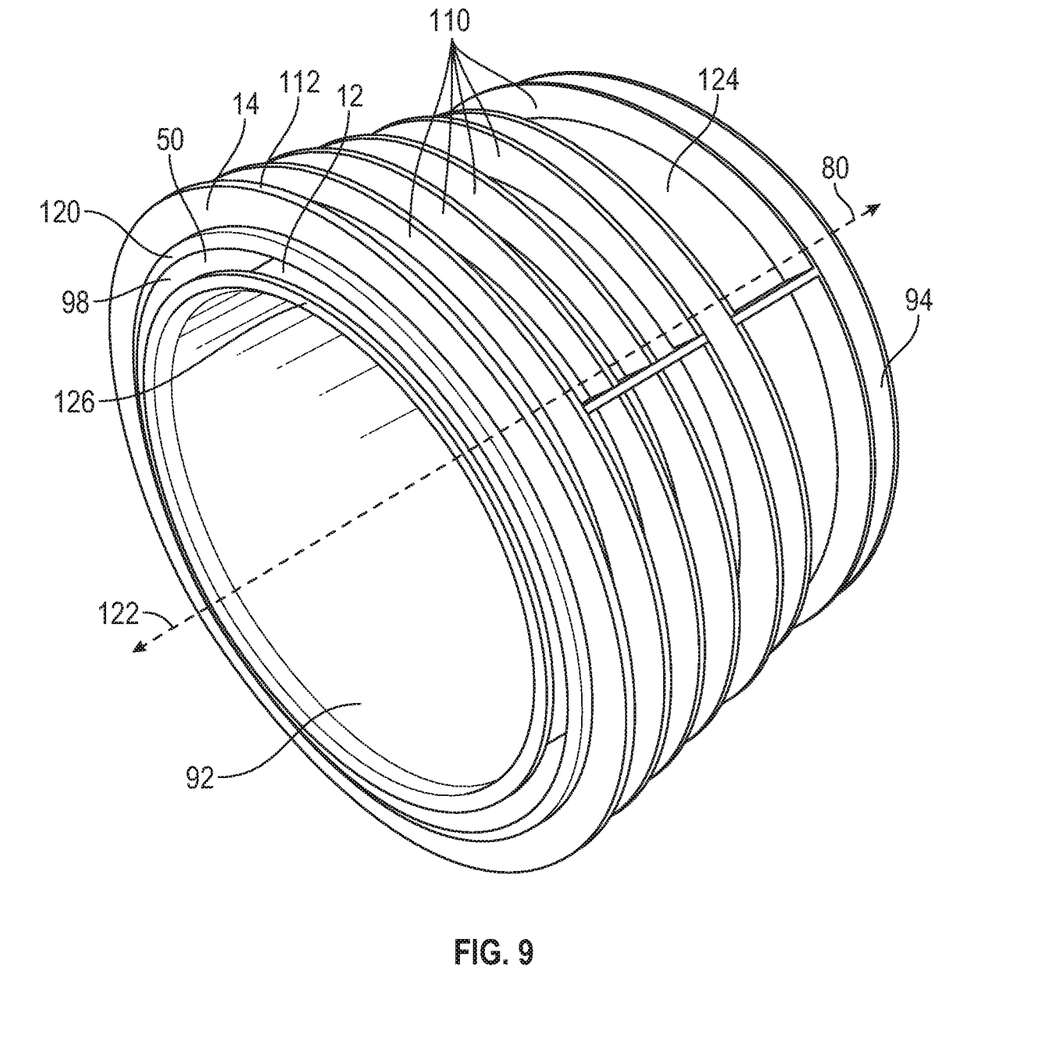
FIG. 9 is a perspective view of transport module, in accordance with features of the present invention.

FIG. 9 illustrates another embodiment of the bag in bag out transport module 20.

Flat ridges 110 circumferentially surround an exterior surface 124 of the bag canister 20 to compress against the flexible movement limiter 26 (not pictured) upon insertion of the bag canister 20 into the transport tunnel 24 (not pictured). The sequential positioning of the flat ridges 110 prevents against unwanted movement of the bag canister 20 in the axial direction 122 opposite to the forward direction 80. However, unlike the arc-shaped protrusions 52 found in the embodiments presented earlier, the flat ridges 110 are non-curved (e.g., straight) and thus do not have a concave interior section facing away from the forward direction 80. This configuration provides stability for the sealing gasket/ring, stability of the canister within the transport tunnel, and forces proper selection and alignment of the sealing gasket/ring. Aside from providing proper alignment, these flat, non-arched ridges also interact with the tips of the movement limiter 26 to facilitate forward only movement of the modules 20.

The bag canister 20 as shown in FIG. 9 may be constructed of a rigid plastic material such as, but not limited to, poly-vinyl chloride ("PVC"). Alternatively, the bag canister may be of metal construction.

Figure 10:
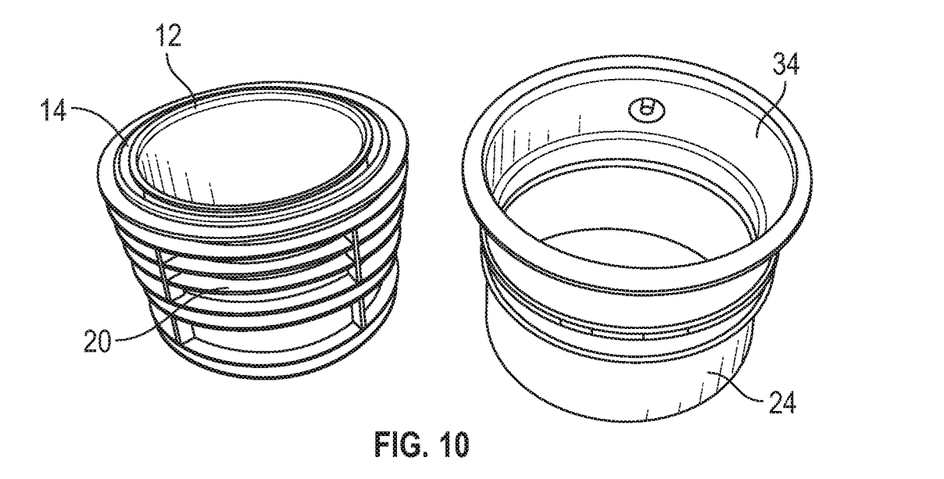
FIG. 10 a top view of transport module and a loading tunnel adapted to receive the module, in accordance with features of the present invention.

FIG. 10 shows a top view of the embodiment of the transport module 20 first shown in FIG. 9 placed alongside an embodiment of the transport tunnel 24. As shown in FIG. 10, the bag canister 20 comprises a double walled cylinder defining an annular space 50 there between adapted to slideably communicate with a plastic bag 82.

FIGS. 9 and 10 show the transport module 20 having sequential ridges 110 circumferentially surrounding the exterior surface 124. The module 20, as shown here, slideably inserts into the transport tunnel 24 where the ridges 110 reversibly interlock with the flexible movement limiter 26 (not pictured) to prevent against unwanted longitudinally directed movement of the bag canister 20 in the direction opposite to the forward direction 80.

Figure 11:
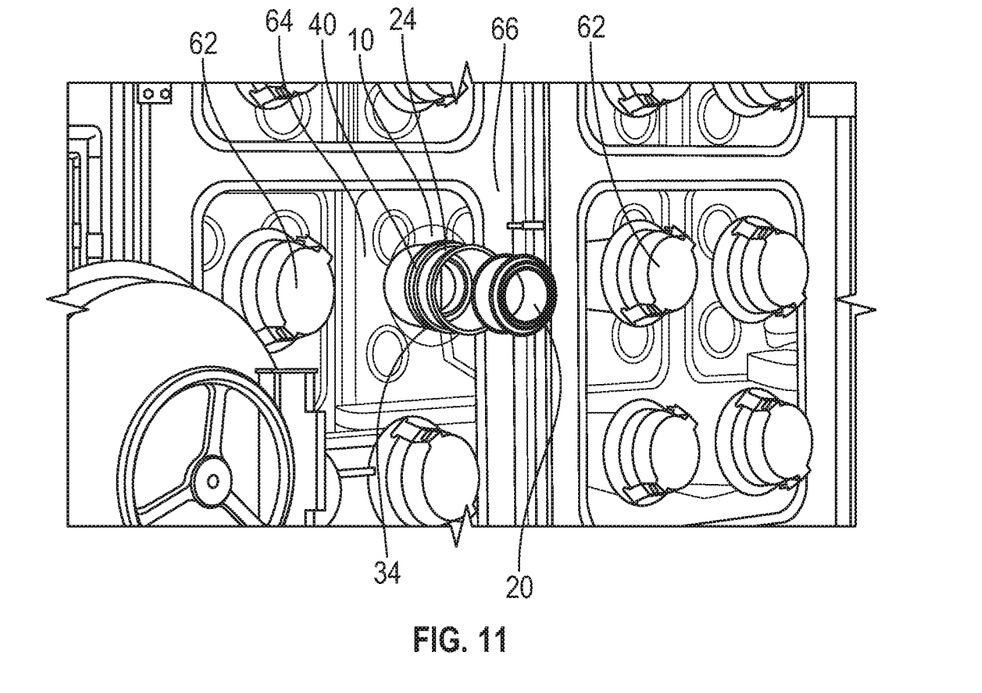
FIG. 11 is a view of the transport tunnel being received by a glovebox wall, and an transport module coaxially aligned with the tunnel, in accordance with features of the present invention transport tunnel.

FIG. 11 shows the loading system 10 as securely mounted on the interface wall 66. The transport module 20 slideably inserts into the transport tunnel 24 which affixes to the attachment sleeve 34. The attachment sleeve 34 mounts onto the glove-port 40 mounted on the interface wall 66. Adjacent glove-ports 62 permit the user to insert a hand into a glove in the adjacent glove-port 62 to extract the pliable bag 82 (not pictured) from inside the loading system 10 to enter the contaminated interior cavity 64 of the glovebox.

Figure 12:
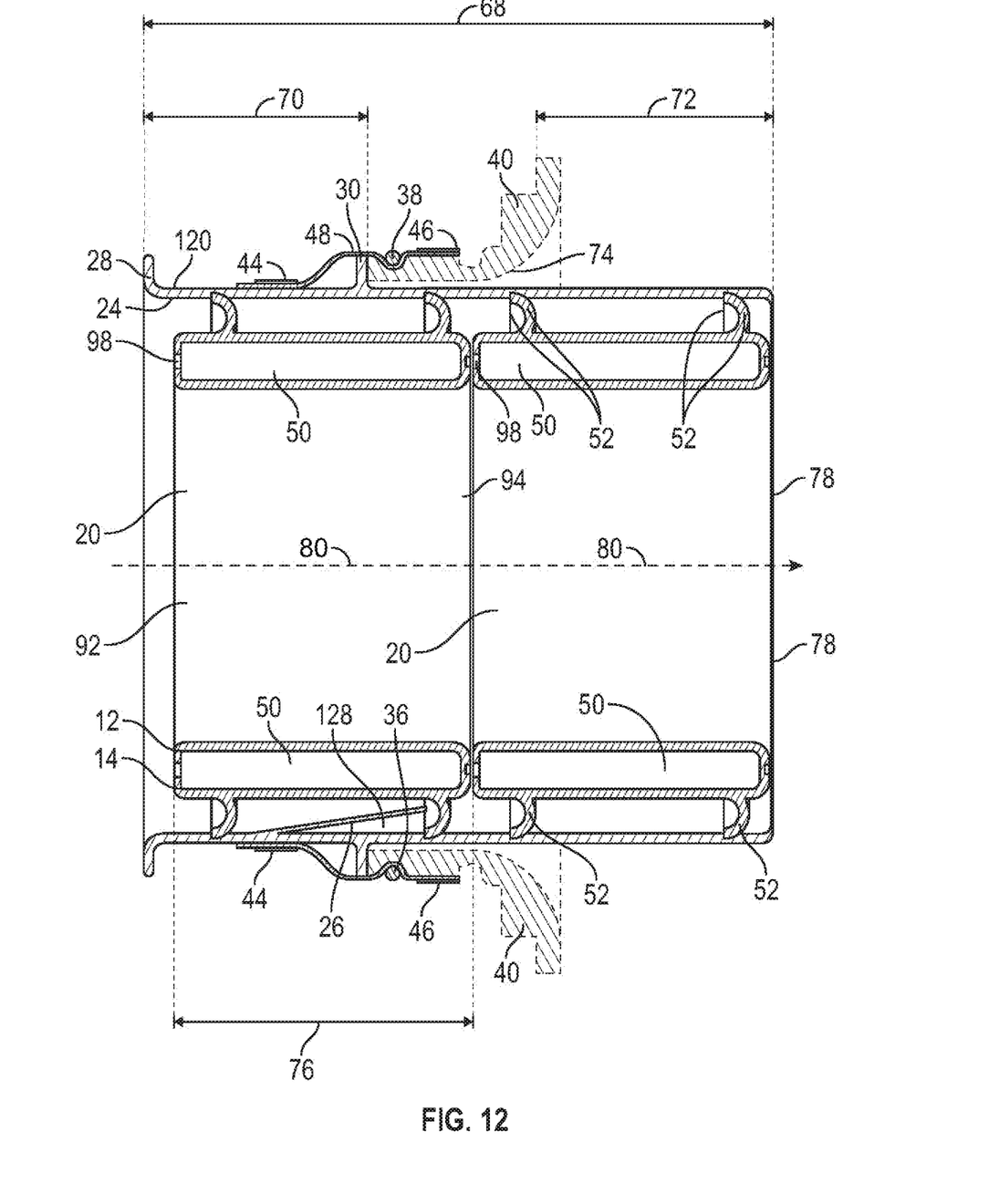
FIG. 12 is a cut-away side view of the transport tunnel as inserted into the attachment sleeve.

FIG. 12 shows a side cut-away view of the loading system 10 including the second transport module 20B inserted in the forward direction 80 into the transport tunnel 24 to press against the materials transport module 20 (such as a spent bag canister). The spent module 20 depleted of the pliable bag 82, in turn, pushes open the flexible rubber seal 78 to depart the transport tunnel 24 and fall into the contaminated interior cavity 64 of the glovebox (not pictured). However, until he spent module is fully detached from the medially facing walls of the tunnel, a hermetic seal exists between the first module 20 and the second module 20B.

Ridges 52 may both be curved or flat, depending on the embodiment chosen, and circumferentially surround an exterior surface 100 of the bag canister 20. The ridges 52 may be made from a rigid material, similar or identical to that selected for construction of the bag canister 20 or any of the other mentioned components. Accordingly, the ridges 52 do not reversibly deform upon insertion into the bag canister 20. The bag canister 20 may be sized such that the ridges 52 contact the interior surface (i.e., the medially facing surface) 102 of the transport tunnel 24 upon insertion of the bag canister 20 into the transport tunnel 24. The ridges 52 remain in contact with the interior surface 102 of the transport tunnel 24 as the bag canister 20 moves in the forward direction 80 to press against the flexible movement limiter 26. To facilitate sealing and easier sliding, silicone or similar lubricant or grease may be employed to convex surfaces of the ridges in contact with the interior surfaces 102 of the tunnel.

The flexible movement limiter 26 extends from the interior surface 102 at an initial angle 128. The flexible movement limiter 26 flattens in response to downward pressure exerted by convex regions of the ridge 52 passing over it. Accordingly, the angle 128 reduces relative to the position of the ridge 52 over the flexible movement limiter. Upon complete passage of the ridge 52 over the flexible movement limiter 26, the flexible movement limiter 26 may spring back into its original position at an initial angle 128, i.e., to its medially-biased position.

Figure 13:
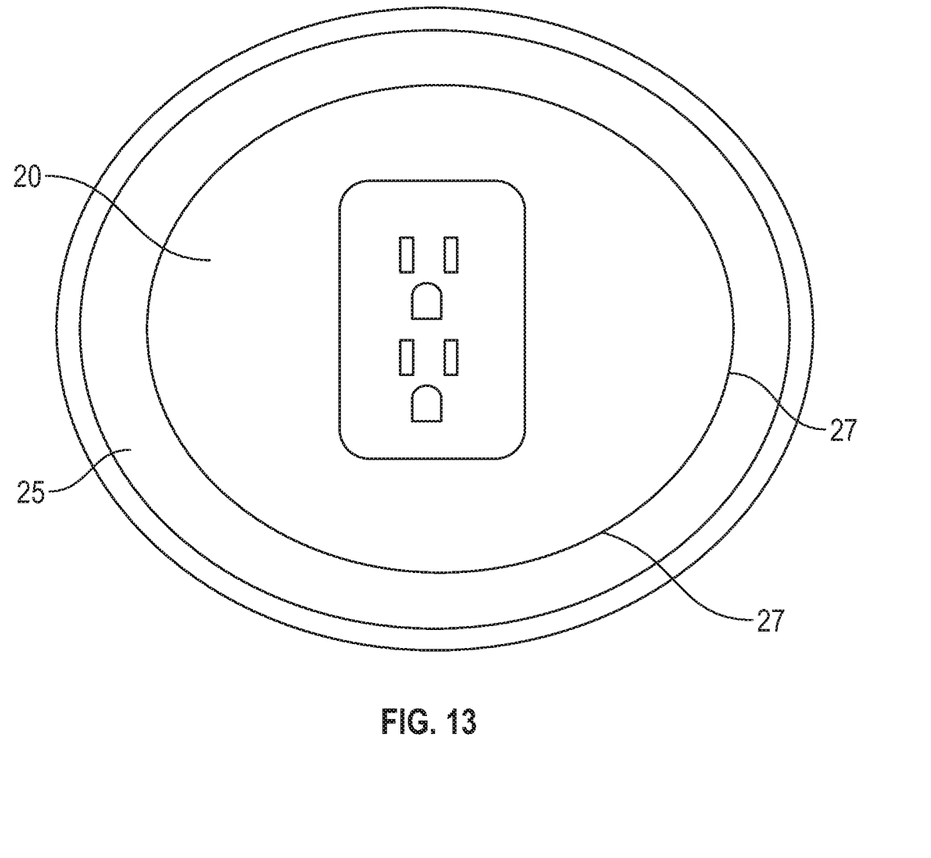
FIG. 13 is a front view of an adapter sleeve for use with the invented transport method and system, in accordance with features of the present invention.

FIG. 13 is a front view of an adapter for use in glove ports (or other access ways having larger than standard diameters. For example, while the above-described materials transport modules 20 can be any size, preferably, the diameters of the modules are dimensioned so as to be received by standard sized glove box ports. For larger sized glovebox ports (e.g., 10 inches in diameter) an adapter cartridge 25 is utilized, of the same general shape and function as the transport module, which is to say, the adapter cartridge has the same peripheral sealing means along it periphery as does the afore-described transport module 20. Similarly the medially facing circumferentially extending surface 27 of the adaptor cartridge has similar structure to that described for the similarly disposed surface of the transport tunnel 24. The surface 27 defines a diameter complementary to the cross section of modules more commonly used. Specifically, a 10" to 8" diameter reducing cartridge allows an 8 inch diameter transport module 20 to be slidably received by the adaptor cartridge 25 and maintain the separation of atmospheres outlined supra in instances where standard 8 inch glove ports are retrofitted.

In summary, the invention provides a system for preventing fluid exchange between the interior and exterior of containment enclosures such as process-, hazard-, and research-enclosure systems generally, gloveboxes, containment systems, isolation systems, confinement systems, cleanrooms, negative air systems, and positive air system areas while simultaneously providing material transfer into and out of the enclosures. The system comprises a cylinder adapted to be received by a region of a containment enclosure forming an aperture so that a hermetic seal exists between the cylinder and the aperture; a canister coaxially positioned within, and in slidable communication with the cylinder such that a hermetic seal exists between the canister and the glove port. The invention also provides a method for transporting material into or out of a containment structure.

Figure 14:
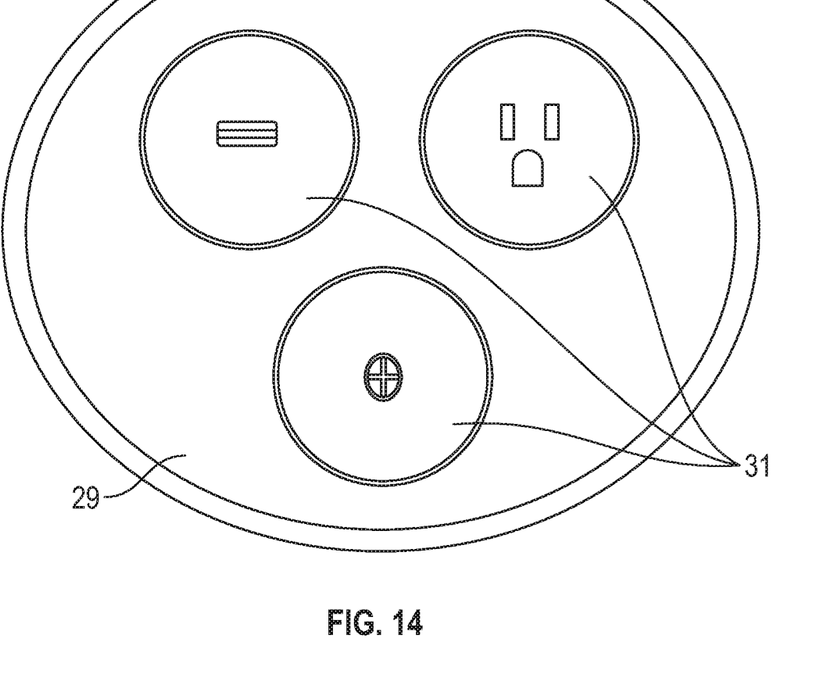
FIG. 14 is a front view of a multi-port transport module, in accordance with features of the present invention.

FIG. 14 is a front view of a multi-port materials transport module 29. In this embodiment, a plurality of ports of ingress and egress to and from the containment atmosphere are provided in one module. The interaction between the peripheries of each of these smaller ports and complementarily shaped miniaturized transport cartridges 31 mimics the interaction in form and function described between the standard materials transport module 20 and tunnel 24 described supra. A salient feature of this multi-port transport module is that each of the miniaturized transport cartridges 31 can be pushed through the transport module 29 independent of the positioning of the remaining miniaturized transport cartridges. In addition, all miniaturized cartridges can advance simultaneously when the multi-port materials transport module 29 is advanced. Further, each of the miniaturized transport modules 31 can be actuated independently of advancement of the multi-port materials transport module 29 through the tunnel 24.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for preventing fluid exchange between the interior and exterior of a containment enclosure during material transport, the system comprising:
   a) a materials transport tunnel wherein the materials transport tunnel comprises a cylinder adapted to be received by a region of the enclosure forming an aperture so that a hermetic seal exists between the cylinder and the aperture wherein the cylinder has continuous solid sides impervious to fluids; and
   b) a first canister coaxially positioned within, and in slidable communication with the cylinder such that a hermetic seal exists between the first canister and the enclosure and a forward end of the first canister is in contact with an interior atmosphere of the enclosure and an aft end of the first canister is not in contact with the interior atmosphere, wherein the first canister is adapted to pass completely through the tunnel;
   c) a second canister coaxially aligned with the first canister and contacting the aft end of the first canister.

2. The system as recited in claim 1 wherein the first and second canisters are simultaneously accommodated by the cylinder.

3. The system as recited in claim 2 wherein an airlock is formed between each of the canisters.

4. The system as recited in 2 wherein the first and second canisters each defines a central aperture and a longitudinally extending annular space circumscribing the aperture.

5. The system as recited in claim 4 further comprising an elongated flexible sleeve having a first end attached to a first end of the canister within the annular space and a second free end adapted to receive material located external of or internal of the enclosure.

6. The system as recited in claim 4 wherein a first end of the annular space is adapted to attach to a first end of a flexible tubular poly sleeve so as to reversibly stow the tubular poly sleeve within the annular space.

7. The system as recited in claim 1 wherein the first canister can be pushed through the cylinder independently of the second canister.

8. The system as recited in claim 1 wherein the aperture is a glove port formed in vertically disposed walls of the enclosure.

9. The system as recited in claim 8 wherein the glove port is 8" in diameter and is formed in vertically disposed walls of a glove box.

10. The system as recited in claim 1 wherein tools, reagents, fluid canisters, aggregate material, and electronic componentry, may be transported via the first and second canisters into the enclosure.

11. The system as recited in claim 1 wherein the forward end is adapted to be pulled by a gloved hand of a user of the system.

* * * * *